(12) United States Patent
Walker

(10) Patent No.: US 10,838,886 B2
(45) Date of Patent: Nov. 17, 2020

(54) CHANNEL DEPTH ADJUSTMENT IN MEMORY SYSTEMS

(75) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 13/089,621

(22) Filed: Apr. 19, 2011

(65) Prior Publication Data

US 2012/0272031 A1  Oct. 25, 2012

(51) Int. Cl.
*G06F 5/00* (2006.01)
*G06F 13/16* (2006.01)
*G06F 12/06* (2006.01)
*G06F 12/10* (2016.01)

(52) U.S. Cl.
CPC ...... *G06F 13/1678* (2013.01); *G06F 12/0607* (2013.01); *G06F 12/10* (2013.01); *G06F 2212/1016* (2013.01); *G06F 2212/1028* (2013.01); *Y02D 10/00* (2018.01)

(58) Field of Classification Search
CPC ... G06F 12/023; G06F 12/0653; G06F 3/0644
USPC .................................................. 711/117, 172
See application file for complete search history.

(56) References Cited

U.S. PATENT DOCUMENTS

| | | | |
|---|---|---|---|
| 5,305,445 A * | 4/1994 | Nishikawa | 711/2 |
| 5,465,332 A | 11/1995 | Deloye et al. | |
| 5,504,871 A * | 4/1996 | Takashi | 711/5 |
| 6,125,421 A | 9/2000 | Roy | |
| 6,393,545 B1 * | 5/2002 | Long et al. | 712/34 |
| 6,411,302 B1 * | 6/2002 | Chiraz | G06F 3/1431 345/531 |
| 6,457,113 B1 * | 9/2002 | Kobayashi | G06F 9/5016 711/145 |
| 6,470,409 B1 * | 10/2002 | Ridgeway | G06F 13/385 710/10 |
| 6,625,685 B1 * | 9/2003 | Cho | G06F 12/0607 711/105 |
| 6,816,165 B1 | 11/2004 | Radke | |
| 6,847,650 B1 * | 1/2005 | Stone et al. | 370/431 |

(Continued)

FOREIGN PATENT DOCUMENTS

| | | |
|---|---|---|
| CN | 101438230 A | 5/2009 |
| CN | 101483061 A | 7/2009 |

(Continued)

OTHER PUBLICATIONS

"International Application Serial No. PCT/US/2012/034125, Search Report dated Nov. 28, 2012", 3 pgs.

(Continued)

*Primary Examiner* — Ryan Bertram
*Assistant Examiner* — Trang K Ta
(74) *Attorney, Agent, or Firm* — Schwegman Lundberg & Woessner, P.A.

(57) ABSTRACT

Memory devices, systems and methods are described, such as those including a dynamically configurable channel depth. Devices, systems and methods are described that adjust channel depth based on hardware and/or software requirements. One such device provides for virtual memory operations where a channel depth is adjusted for the same physical memory region responsive to requirements of different memory processes.

26 Claims, 3 Drawing Sheets

(56) References Cited

U.S. PATENT DOCUMENTS

| | | | |
|---|---|---|---|
| 6,978,259 B1* | 12/2005 | Anderson | G06F 3/0605 706/19 |
| 7,260,656 B2* | 8/2007 | Matsunami | G06F 3/0607 710/36 |
| 7,765,366 B2 | 7/2010 | Akiyama et al. | |
| 7,779,215 B2 | 8/2010 | Liou et al. | |
| 7,797,319 B2 | 9/2010 | Piedmonte et al. | |
| 8,018,752 B2 | 9/2011 | Jeddeloh | |
| 8,892,844 B2 | 11/2014 | Walker | |
| 9,933,972 B2 | 4/2018 | Walker | |
| 10,162,557 B2 | 12/2018 | Walker | |
| 2001/0039605 A1* | 11/2001 | Uematsu | G06F 13/1668 711/154 |
| 2003/0088742 A1* | 5/2003 | Lee | G06F 12/0848 711/147 |
| 2005/0033935 A1* | 2/2005 | Manbert | G06F 3/0608 711/170 |
| 2005/0120160 A1 | 6/2005 | Plouffe et al. | |
| 2006/0129728 A1* | 6/2006 | Hampel | G06F 13/1668 710/118 |
| 2006/0129767 A1 | 6/2006 | Berenyi et al. | |
| 2006/0233367 A1 | 10/2006 | Birrell et al. | |
| 2006/0294325 A1 | 12/2006 | Akiyama et al. | |
| 2007/0226795 A1 | 9/2007 | Conti et al. | |
| 2007/0260782 A1* | 11/2007 | Shaikli | H04L 49/9052 710/52 |
| 2008/0141043 A1* | 6/2008 | Flynn | G06F 3/0613 713/193 |
| 2008/0250212 A1* | 10/2008 | Asaro et al. | 711/157 |
| 2008/0256292 A1* | 10/2008 | Flynn | G06F 12/123 711/114 |
| 2008/0320476 A1 | 12/2008 | Wingard et al. | |
| 2009/0182976 A1 | 7/2009 | Agesen | |
| 2009/0307455 A1* | 12/2009 | Pliss et al. | 711/170 |
| 2009/0307458 A1 | 12/2009 | Nogueras et al. | |
| 2010/0115228 A1 | 5/2010 | Parker et al. | |
| 2010/0220359 A1* | 9/2010 | Ohgishi | G06F 9/5077 358/1.16 |
| 2010/0251223 A1 | 9/2010 | Gordy et al. | |
| 2011/0055430 A1 | 3/2011 | Chen et al. | |
| 2011/0107054 A1* | 5/2011 | Hepkin et al. | 711/172 |
| 2011/0314238 A1* | 12/2011 | Finkler | G06F 9/544 711/162 |
| 2012/0191921 A1* | 7/2012 | Shaeffer | G06F 13/1678 711/149 |
| 2012/0233413 A1 | 9/2012 | Walker | |
| 2015/0074370 A1 | 3/2015 | Walker | |
| 2018/0300079 A1 | 10/2018 | Walker | |

FOREIGN PATENT DOCUMENTS

| | | |
|---|---|---|
| CN | 103493026 A | 1/2014 |
| CN | ZL 201280019658.6 | 2/2017 |
| CN | 107025181 A | 8/2017 |
| EP | 0777233 A1 | 6/1997 |
| EP | 2684133 B1 | 5/2018 |
| JP | 9259041 A | 10/1997 |
| JP | 10232819 A | 9/1998 |
| JP | 2005100418 A | 4/2005 |
| JP | 2006024233 A | 1/2006 |
| JP | 2008544414 A | 12/2008 |
| KR | 100268321 | 10/2000 |
| KR | 1020080014066 A | 2/2008 |
| KR | 1020090130755 A | 12/2009 |
| KR | 101993651 B1 | 6/2019 |
| TW | 201027541 A | 7/2010 |
| TW | I541648 B | 7/2016 |
| WO | WO-2004029816 A2 | 4/2004 |
| WO | WO-2010111281 A2 | 9/2010 |
| WO | WO-2012122182 A2 | 9/2012 |
| WO | WO-2012122182 A3 | 9/2012 |
| WO | WO-2012145432 A3 | 10/2012 |

OTHER PUBLICATIONS

"International Application Serial No. PCT/US/2012/034125, Written Opinion dated Nov. 28, 2012", 5 pgs.

"International Application Serial No. PCT/US2012/034125, International Preliminary Report on Patentability dated Oct. 31, 2013", 7 pgs.

"European Application Serial No. 12774647.7, Office Action dated Dec. 17, 2013", 3 pgs.

"European Application Serial No. 12774647.7, Response filed Jun. 5, 2014 to Office Action dated Dec. 17, 2013", 5 pgs.

"European Application Serial No. 12774647.7, Response filed Nov. 6, 2015 to Extended European Search Report dated Apr. 15, 2015", 10 pgs.

"Japanese Application Serial No. 2014-506522, Office Action dated Apr. 19, 2016", 5 pgs.

"Taiwanese Application Serial No. 101114017, Response filed Feb. 17, 2016 to Office Action dated Nov. 17, 2015", (English Translation of Claims), 10 pgs.

"Chinese Application Serial No. 201280019037.8, Office Action dated May 5, 2016", With English Translation, 21 pgs.

"Chinese Application Serial No. 201280019037.8, Office Action dated Aug. 29, 2016", (With English Translation), 5 pgs.

"Chinese Application Serial No. 201280019037.8, Response filed Nov. 3, 2016 to Office Action dated Aug. 29, 2016", with English Translation, 32 pgs.

"Japanese Application Serial No. 2014-506522, Office Action dated Sep. 5, 2017", w/English Translation, 20 pgs.

"Japanese Application Serial No. 2014-506522, Response filed Oct. 16, 2017 to Office Action dated Sep. 5, 2017", w/English Claims, 7 pgs.

"Korean Application Serial No. 10-2013-7030191, Office Action dated Apr. 29, 2019", w English translation, 7 pgs.

"Korean Application Serial No. 10-2013-7030191, Notice of Preliminary Rejection dated Jul. 31, 2018", W/English Translation, 7 pgs.

"Korean Application Serial No. 10-2013-7030191, Responsed filed Dec. 11, 2018 to Notice of Preliminary Rejection dated Jul. 31, 2018", w/English Claims, 17 pgs.

"Chinese Application Serial No. 201280019658.6, Office Action dated Jun. 2, 2016", With English Translation, 7 pgs.

"Chinese Application Serial No. 201280019658.6, Office Action dated Jul. 29, 2015", w/English Translation, 23 pgs.

"Chinese Application Serial No. 201280019658.6, Office Action dated Dec. 15, 2015", W/English Translation, 7 pgs.

"Chinese Application Serial No. 201280019658.6, Response filed Feb. 25, 2016 to Office Action dated Dec. 15, 2015", w/English Claims, 19 pgs.

"Chinese Application Serial No. 201280019658.6, Response filed Aug. 17, 2016 to Office Action dated Jun. 2, 2016", w/English Claims, 22 pgs.

"Chinese Application Serial No. 201280019658.6, Response filed Oct. 19, 2015 to Office Action dated Jul. 29, 2015", w/English Claims, 15 pgs.

"European Application Serial No. 12755210,7 Response filed Jul. 16, 2015 to Extended European Search Report dated Apr. 10, 2015", With the amended claims, 38 pgs.

"European Application Serial No. 12755210.7, Extended European Search Report dated Apr. 10, 2015", 5 pgs.

"European Application Serial No. 18170452.9, Extended European Search Report dated Jul. 20, 2018", 8 pgs.

"International Application Serial No. PCT/US2012/027905, International Preliminary Report on Patentability dated Oct. 2, 2013", 9 pgs.

"International Application Serial No. PCT/US2012/027905, Search Report dated Sep. 28, 2012", 3 pgs.

"International Application Serial No. PCT/US2012/027905, Written Opinion dated Sep. 28, 2012", 7 pgs.

"Korean Application Serial No. 10-2013-7025982, Notice of Preliminary Rejection dated Jul. 20, 2018", W/English Translation, 8 pgs.

(56) References Cited

OTHER PUBLICATIONS

"Korean Application Serial No. 10-2013-7025982, Response filed Nov. 20, 2018 to Notice of Preliminary Rejection dated Jul. 20, 2018", w/ English Claims, 22 pgs.

"Korean Application Serial No. 10-2013-7030191, Response filed Jul. 1, 2019 to Office Action dated Apr. 29, 2019", w/ English Claims, 9 pgs.

"Taiwan Application Serial No. 101107727, Office Action dated Dec. 7, 2015", w/English Translation, 12 pgs.

"Taiwanese Application Serial No. 101107727, Response filed Mar. 10, 2016to Office Action dated Dec. 7, 2015", w/English Claims, 25 pgs.

U.S. Appl. No. 13/042,164 U.S. Pat. No. 8,892,844, filed Mar. 7, 2011, Methods of Accessing Memory Cells, Methods of Distributing Memory Requests, Systems, and Memory Controllers.

U.S. Appl. No. 14/542,750 U.S. Pat. No. 9,933,972, filed Nov. 17, 2014, Methods of Accessing Memory Cells, Methods of Distributing Memory Requests, Systems, and Memory Controllers.

U.S. Appl. No. 15/918,178 U.S. Pat. No. 10,162,557, filed Mar. 12, 2018, Methods of Accessing Memory Cells, Methods of Distributing Memory Requests, Systems, and Memory Controllers.

U.S. Appl. No. 16/230,157, filed Dec. 21, 2018, Methods of Accessing Memory Cells, Methods of Distributing Memory Requests, Systems, and Memory Controllers.

"Korean Application Serial No. 10-2013-7030191, Final Office Action dated Nov. 28, 2019", W English Translation, 7 pgs.

"Korean Application Serial No. 10-2013-7030191, Response filed Feb. 27, 2020 to Final Office Action dated Nov. 28, 2019", w English Claims, 20 pgs.

"European Application Serial No. 12774647.7, Extended European Search Report dated Apr. 15, 2015", 5 pgs.

"Korean Application Serial No. 10-2013-7030191, Second Final Office Action dated Mar. 30, 2020", w/ English Translation, 8 pgs.

"Korean Application Serial No. 10-2020-7012840, Notice of Preliminary Rejection dated Jun. 29, 2020", w/ English Translation, 8 pgs.

* cited by examiner

CHANNEL DEPTH ADJUSTMENT IN MEMORY SYSTEMS

BACKGROUND

Computer memory operation often deals with competing technical hurdles. Fast memory performance can be obtained by designing devices with high bandwidth. However, high bandwidth often requires high amounts of power to operate. Low power consumption is also desirable, and often competes with the desire for faster memory operation. It is desirable to provide memory devices that improve memory speed and also improve power consumption.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and material, structural, logical, electrical changes, etc. may be made.

Figure 1:
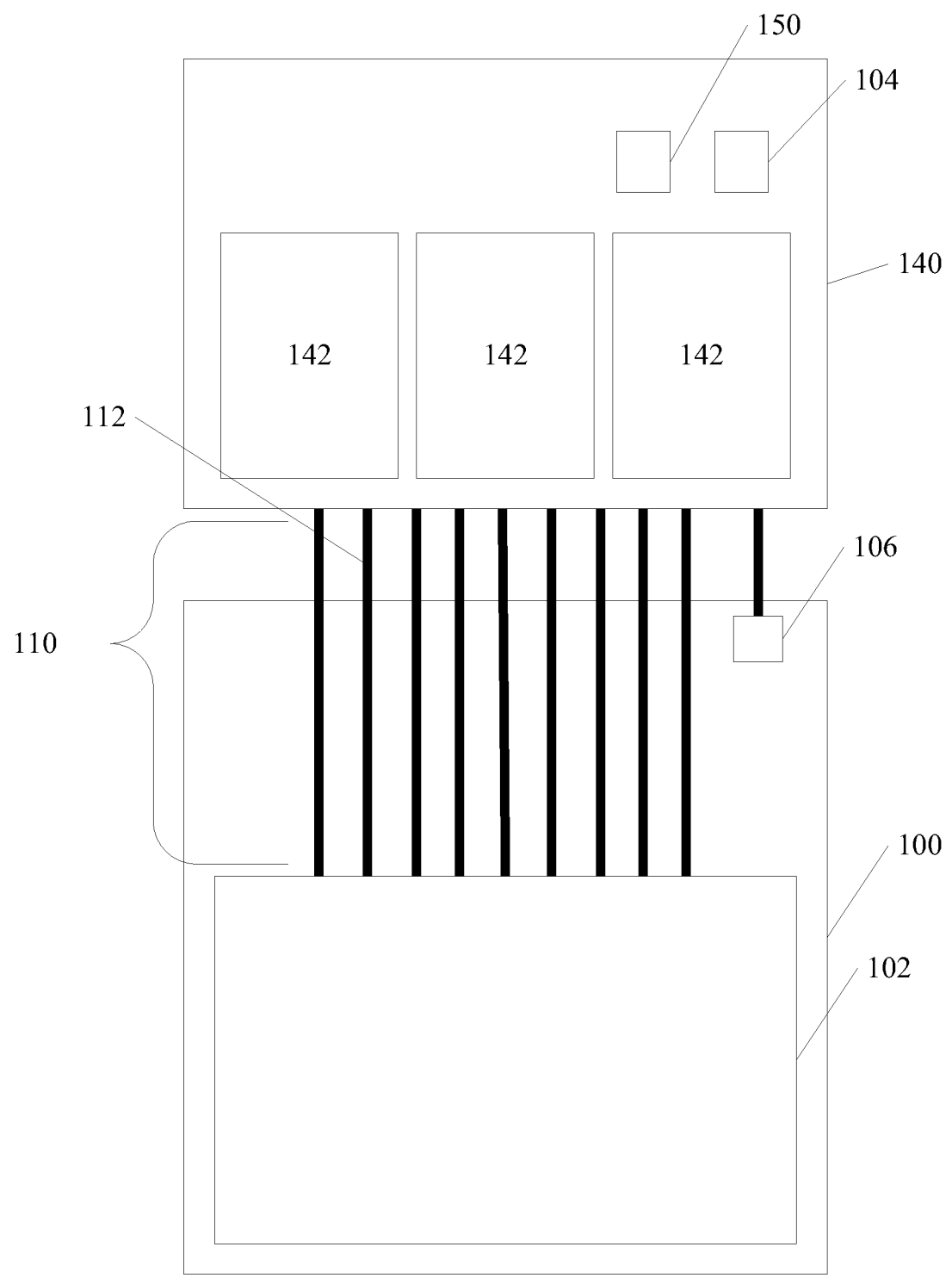
FIG. 1 shows a system that includes a memory system coupled to an electronic system according to an embodiment of the invention.

FIG. 1 shows a memory system 100 coupled (e.g., via wireless, non-wireless, or optical interface, for example) to an electronic system 140. Examples of memory systems 100 may include one or more individual memory devices coupled together. In one example, a system that includes the memory system 100 and electronic system 140 can be an information handling system, such as a personal computer, similar to examples described in FIG. 3 below. Other such systems can include, for example, music players, telephones, netbooks, etc. The electronic system 140 in FIG. 1 includes a number of masters 142. Examples of masters 142 include, but are not limited to, hardware devices, such as processors, Graphic Processors (GPUs), etc., or any number of individual software applications. Although multiple masters 142 are shown in FIG. 1, the invention is not so limited. Other configurations include only a single master 142.

The memory system 100 of FIG. 1 includes a memory device 102, such as a module or modules of physical memory (whether centrally located or dispersed throughout a system) which is conceptually divisible (e.g., by a memory map 104) into a number of various memory regions (e.g., portions). The memory system 100 is coupled to and accessed by the electronic system 140 using a dynamic channel 110. The dynamic channel 110 is shown including a number of configurable channel portions 112.

In a memory operation, configurable channel portions 112 are dynamically used, or left idle in the dynamic channel 110. By adding configurable channel portions 112, a channel width can be increased to allow more data to pass from the electronic system 140 to the memory system 100 in parallel. In one example, one or more channel portions 112 includes a configurable depth. In contrast to channel width, in the present disclosure, depth of a channel portion can be defined as, for example, a number of bytes that are accessed using a channel portion 112 before using the next channel portion 112 during a memory operation.

In one example, for a given memory transfer, a selected channel depth also determines a channel width. For example, in a system with 8 available channel portions 112, and a 128B transfer, if a channel depth is selected as 16B, then each channel portion will transfer 16B before incrementing to the next channel portion 112, and the 128B will be transferred once 8 channel portions have been incremented. If instead, a channel depth is selected as 32B, then each channel portion will transfer 32B before incrementing to the next channel portion 112, and the 128B will be transferred once 4 channel portions have been incremented.

In selected memory operations, a wide channel or parallel system (e.g. high bandwidth) beyond a given width is not necessary. For example, in a read operation, if the master 142 receiving the data cannot process the data faster than a given speed, then any extra channel width enabling data speed beyond that given speed is unnecessary. In one example, the dynamic channel 110 is configured to provide a channel depth/width that is optimized for a given master 142. Unused configurable channel portions 112, and the associated memory array are not activated (e.g. powered up), and the memory device 100 is more energy efficient. One example of a memory operation where additional channel width (bandwidth) is not necessary may include a graphics operation. Graphics masters may be more insensitive to latency, and an extra few nanoseconds of time for the data transaction should not affect performance.

The memory system 100 of FIG. 1 also includes a memory map 104, stored as data, and represented in FIG. 1 in block diagram form. In the present disclosure, the memory map is a conceptual structure, stored in memory, and is represented as a block 104 for illustration purposes. In one example, the memory map 104 is stored in non-volatile memory or on a drive and is read at boot time. The memory map 104 tells memory firmware the storage capacity of the memory device 100 and defines variables such as size of different regions of memory, and characteristics of the dynamic channel 110 for the different regions of memory.

In one example, the data from the memory map adjusts a channel depth of one or more configurable channel portions 112 up or down dynamically during memory operations. In one example, the memory map is changed to adjust channel depths of the configurable channel portions 112 of the dynamic channel 110 in response to different masters 142. In one example, the memory map is changed to adjust the channel depths of the configurable channel portions 112 in response to different software applications. Different software applications may utilize data at different speeds. By optimizing channel depth within the dynamic channel 110 to match the software application, power savings may be realized, or improved application speed may be realized, depending on the capabilities of the software application.

In one example, the memory map 104 receives a channel depth selection signal to adjust the channel depth from a memory request. In such a configuration, the channel depth is persistent with data in a memory request. In one example a channel depth is included in memory address bits in a memory request. One example memory request includes bits that correspond to a row select, a bank select, and a column select of a physical address. In such an address configuration, a top of the hierarchy can be the row, then the bank, then the column. The closer to the least significant bits of the address that the channel select bits are located, the fewer the number of bytes that will be accessed per channel before moving to the next channel. In one example, channel select bits are located after the bank select bits. In another example, the channel select bits are interleaved with the column select bits.

In one example, the memory system 100 includes a register 106 to adjust channel depth within the dynamic channel 110. Example configurations using a register 106, include selection of a channel depth by request from a hardware master 142.

Figure 2:
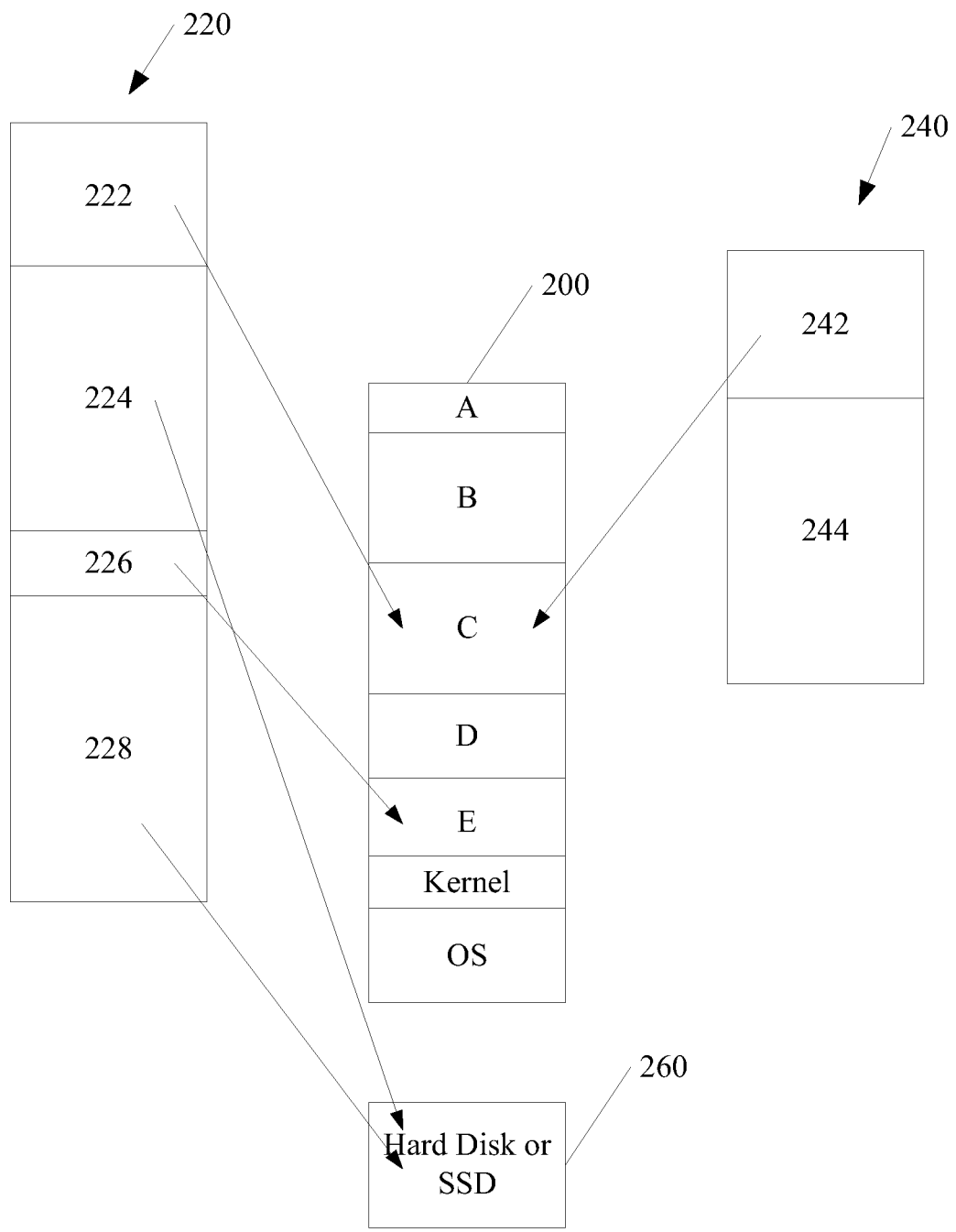
FIG. 2 shows a block diagram of a memory system in operation according to an embodiment of the invention.

FIG. 2 shows a memory system, such as memory system 100 from FIG. 1, comprising a first memory device 200. The first memory device 200 (e.g., a main memory module or modules) is shown as being conceptually divided (e.g., by a memory map) into a number of regions A-E that are used below in discussion of memory operations. Also shown are a Kernel region, and an operating system region (OS). Although the regions A-E, Kernel, and OS are shown occupying all of the space of the first memory device 200, the block diagram of FIG. 2 is only a regional example. For example, the physical memory and/or virtual memory of a memory system may be larger or smaller than the illustration shown in FIG. 2.

In one example, memory device 200 is coupled to a dynamic channel, such as dynamic channel 110 as shown in FIG. 1. In one example, regions A-E can all be accessed using the memory map to dynamically select channel depths. In one example, the Kernel region is accessed using a fixed channel depth. In one example, the OS region is accessed using a fixed channel depth. In one example, both the Kernel and the OS regions have a fixed channel depth. The respective fixed channel depths of the Kernel and the OS regions may be the same depth, or they may have different fixed channel depths, depending on requirements such as memory speed and power requirements.

A secondary memory device 260 (e.g. a hard disk drive or solid state drive (SSD)) is also illustrated in FIG. 2. In selected embodiments of the invention, a virtual memory configuration such as a paging configuration uses the secondary memory device 260 to expand the memory capabilities of the memory system.

A first memory operation (e.g., virtual memory process 220) and a subsequent, second memory operation (e.g., virtual memory process 240) are shown in FIG. 2. In one example, the requirements (e.g. latency, bandwidth, power) of the first memory process 220 are different than the requirements of the second memory process 240. The first process 220 is shown having data part 222 (e.g., a page) allocated (e.g., by the operating system) to region C, data part 226 allocated to region E, and data parts 224 and 228 allocated to secondary memory 260. The second process 240 is shown having data part 242 allocated to region C at a different time, such as where the operating system has re-allocated region C to the second process 240 after the first process 220 has been completed.

In one embodiment, when pages of a virtual memory are allocated by the OS, a channel depth for the pages is declared at that time. In one example, the declared channel depth is persistent until the page is swapped out, or reclaimed when a given process is complete. Because different processes using virtual memory can have different requirements with regard to latency, bandwidth, and power, the process of accessing the memory using different depths at different times can produce optimized memory accesses for the particular process running at that time.

In the second memory process 240 of FIG. 2, a second channel depth is declared, responsive to (e.g., based on) the requirements of the second memory process 240. As discussed in embodiments above, the requirements can be either hardware based, software based, or both. The example of FIG. 2 illustrates that in selected memory operations including two or more memory processes (220, 240), a channel depth can be configured differently over time, even though different memory processes use the same physical region of memory (C).

Figure 3:
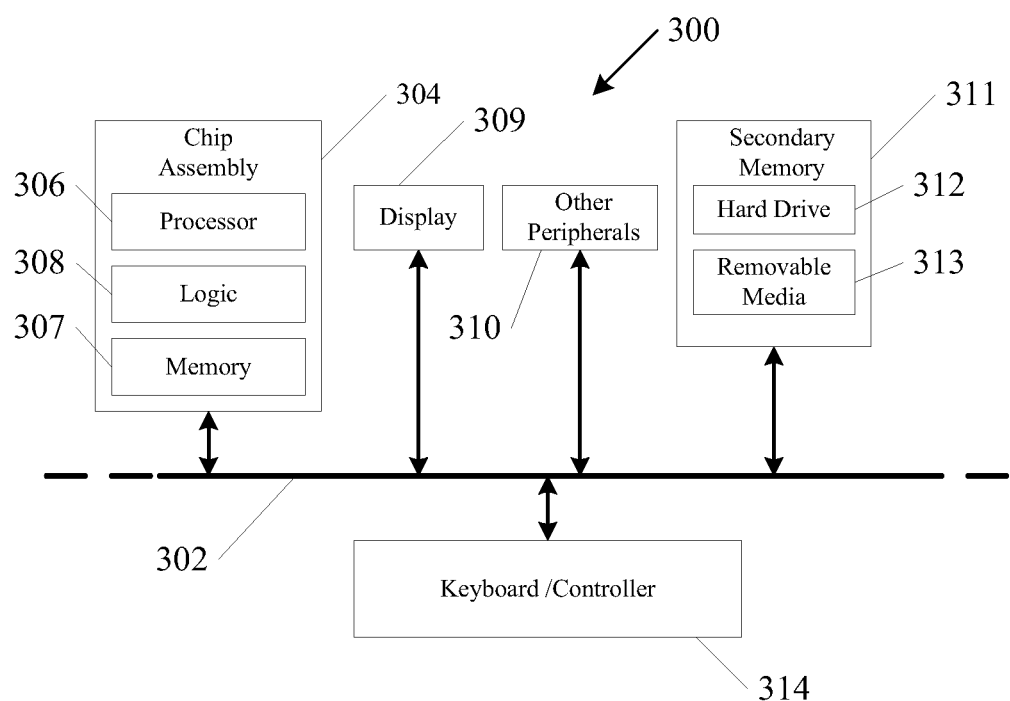
FIG. 3 shows an information handling system including a memory device according to an embodiment of the invention.

An embodiment of an information handling system such as a computer is included in FIG. 3 to show an embodiment of a higher-level device application for the present invention. FIG. 3 is a block diagram of an information handling system 300 incorporating a dynamic channel memory device of the invention as described above. Information handling system 300 is merely one embodiment of a system in which dynamic channel memory devices of the present invention can be used. Other examples include, but are not limited to, netbooks, cameras, personal data assistants (PDAs), cellular telephones, MP3 players, aircraft, satellites, military vehicles, etc.

In this example, information handling system 300 comprises a data processing system that includes a system bus 302 to couple the various components of the system. System bus 302 provides communications links among the various components of the information handling system 300 and may be implemented as a single bus, as a combination of busses, or in any other suitable manner.

Chip assembly 304 is coupled to the system bus 302. Chip assembly 304 may include any circuit or operably compatible combination of circuits. In one embodiment, chip assembly 304 includes a processor 306 that can be of any type. As used herein, "processor" means any type of computational circuit such as, but not limited to, a microprocessor, a microcontroller, a graphics processor, a digital signal processor (DSP), or any other type of processor, processing circuit or cores thereof.

In one embodiment, a memory device 307 is included in the chip assembly 304. In one embodiment, additional logic chips 308 other than processor chips are included in the chip assembly 304. An example of a logic chip 308 other than a processor includes a memory controller. Other circuits on logic chips 308 such as custom circuits, an application-specific integrated circuit (ASIC), etc. are also included in one embodiment of the invention.

Information handling system 300 may also include secondary memory 311, which in turn can include one or more memory elements suitable to the particular application, such as one or more hard drives 312, and/or one or more drives that handle removable media 313 such as compact disks (CDs), flash drives, digital video disks (DVDs), and the like.

Information handling system 300 may also include a display device 309 such as a monitor, additional peripheral components 310, such as speakers, etc. and a keyboard and/or controller 314, which can include a mouse, trackball, game controller, voice-recognition device, or any other device that permits a system user to input data into and receive data from the information handling system 300.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A method, comprising:
   accessing a memory region of a memory device during a first memory operation by using a dynamic channel including multiple channel portions, each channel portion having a first channel depth and a first channel width, the channel depth of each channel portion being a number of bytes that can be accessed using a channel portion before using a next channel portion during a memory operation, and a channel width of the channel being an amount of data that can pass to the memory region in parallel through the channel portion; and
   in response to the memory region being allocated to a second memory operation, the second memory operation different from the first memory operation, adjusting the channel depth of one or more channel portions from the first channel depth to a second channel depth to access the memory region, and adjusting the channel width of the one or more channel portions from a first channel width to a second channel width, the second channel depth being different from the first channel depth, and the second channel width being different from the first channel width.

2. The method of claim 1, wherein the first memory operation comprises a first virtual memory process and wherein the second memory operation comprises a second virtual memory process.

3. The method of claim 1, wherein adjusting the channel depth comprises adjusting the channel depth based on a capability of software using the memory region during the second memory operation.

4. The method of claim 1, wherein adjusting the channel depth comprises adjusting the channel depth based on a capability of hardware using the memory region during the second memory operation.

5. The method of claim 1, adjusting the channel depth comprises sending a channel depth selection signal from a hardware master.

6. The method of claim 1, adjusting the channel depth comprises adjusting the channel depth responsive to a register in a memory controller coupled to the memory device.

7. The method of claim 1, wherein the channel depth is persistent with data from a master to a memory controller.

8. The method of claim 1, wherein adjusting the channel depth comprises adjusting the channel depth responsive to a memory request.

9. A method, comprising:
   accessing a memory region of a memory device responsive to a first memory request by using a dynamic channel including multiple channel portions, each channel portion having a first channel depth and a first channel width, the channel depth of each channel portion being a number of bytes that can be accessed using the channel portion before using a next channel portion during a memory operation, and a channel width being an amount of data that can pass to the memory region in parallel through the channel; and
   in response to a change from the first memory request to a second memory request, the second memory request different from the first memory request, adjusting the channel depth of one or more channel portions to access the memory region from the first channel depth to a second channel depth, and adjusting the channel width of the one or more channel portions from a first channel width to a second channel width, the second channel depth being different from the first channel depth, and the second channel width being different from the first channel width.

10. The method of claim 9, wherein the second memory request further includes row select bits and bank select bits.

11. The method of claim 10, wherein the channel select bits are after the bank select bits.

12. The method of claim 11, wherein the channel select bits are interleaved with the column select bits.

13. A method, comprising:
    accessing a memory region of a memory device by using a dynamic channel including a number of channel portions, each channel portion having a first channel depth and a first channel width, the channel depth being a number of bytes that can be accessed using the channel portion before using a next channel portion during a memory operation, and the channel width being an amount of data that can pass to the memory region in parallel through the channel portion;
    allocating the one or more channel portions of the dynamic channel to a first page of virtual memory for a first memory operation; and
    reallocating one or more channel portions of the dynamic channel to a second page of virtual memory for a second memory operation, the reallocating including adjusting the channel depth of one or more channel portions from the first channel depth to a second channel depth, and adjusting the channel width of the channel from a first channel width to a second channel width, the second channel depth being different from the first channel depth, and the second channel width being different from the first channel.

14. The method of claim 13, wherein the memory region comprises a first region and wherein a channel depth of a second region of the memory device is fixed during operation of the memory device.

15. The method of claim 14, wherein the second region includes a kernel region.

16. The method of claim 15, wherein the second region includes an operating system region.

17. The method of claim 16, wherein a fixed channel depth of the kernel region is different than a fixed channel depth of the operating system region.

18. A system, comprising:
    a memory controller to manage a virtual memory process;
    a number of memory regions;
    a first channel of a first memory region including a number of channel portions to access the number of memory regions, wherein each channel portion of the number of channel portions has a channel depth, the channel depth being a number of bytes that can be accessed using the channel portion before using a next channel portion during a memory operation, and the channel width of the channel being an amount of data that can pass to the memory region in parallel through the first channel; and
    a memory map to adjust the channel depth of one or more channel portions for the first memory region at different times responsive to different virtual memory operations allocated to the first memory region, wherein in response to the memory region being allocated to different virtual memory operations, adjusting the channel depth of one or more channel portions of the first channel from the first channel depth to a second channel depth and adjusting the channel width of the first channel from a first channel width to a second channel width, the second channel depth being different from the first channel depth, and the second channel width being different from the first channel width.

19. The system of claim 18, further including a register to store a selected channel depth.

20. The system of claim 18, wherein the memory map is configured to interpret channel depth requests from within an address in a memory request.

21. The system of claim 18, wherein the memory map is configured to interpret channel depth requests from a number of different hardware masters.

22. The system of claim 18, wherein a channel depth of a kernel memory region is fixed.

23. The system of claim 18, wherein a channel depth of an operating system memory region is fixed.

24. A system, comprising:
a memory device including a number of memory regions; and
a first channel including a number of channel portions to access the number of memory regions, wherein each channel portion of the first channel has a channel depth and a channel width, the channel depth being a number of bytes that can be accessed using the channel portion before using a next channel portion during a memory operation, and the channel width of the channel being an amount of data that can pass to the memory region in parallel through the channel portion, wherein the channel depth of each channel portion is dynamically adjustable responsive to different memory operations, and
wherein in response to the memory region being allocated to different virtual memory operations, adjusting the channel depth of one or more channel portions from a first channel depth to a second channel depth and adjusting the channel width of the one or more channel or portions from a first channel width to a second channel width, the second channel depth being different from the first channel depth, and the second channel width being different from the first channel width.

25. The system of claim 24, further comprising a memory map, wherein the memory map can be changed to adjust the depth of the at least one of the channel portions.

26. The system of claim 25, wherein the memory map is stored in the memory device.

* * * * *